United States Patent
Gühring et al.

(10) Patent No.: US 7,653,226 B2
(45) Date of Patent: Jan. 26, 2010

(54) FLEXIBLE GENERATION OF DIGITALLY RECONSTRUCTED RADIOGRAPHS

(75) Inventors: Jens Gühring, Langensendelbach (DE); Sebastian Vogt, Princeton, NJ (US); Ali Khamene, Princeton, NJ (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 850 days.

(21) Appl. No.: 10/953,342

(22) Filed: Sep. 29, 2004

(65) Prior Publication Data

US 2005/0238223 A1 Oct. 27, 2005

Related U.S. Application Data

(60) Provisional application No. 60/564,149, filed on Apr. 21, 2004.

(51) Int. Cl.
- G06K 9/00 (2006.01)
- G06K 9/40 (2006.01)
- A61B 5/00 (2006.01)
- A61B 6/00 (2006.01)

(52) U.S. Cl. .......... 382/128; 382/132; 382/254; 600/310; 600/473

(58) Field of Classification Search .......... 382/128, 382/132, 154, 276
See application file for complete search history.

(56) References Cited

U.S. PATENT DOCUMENTS

| | | | | |
|---|---|---|---|---|
| 5,368,033 A | * | 11/1994 | Moshfeghi | 600/419 |
| 5,515,856 A | * | 5/1996 | Olstad et al. | 600/440 |
| 5,640,436 A | * | 6/1997 | Kawai et al. | 378/4 |
| 5,891,030 A | * | 4/1999 | Johnson et al. | 600/407 |
| 6,317,137 B1 | * | 11/2001 | Rosasco | 345/582 |
| 6,426,987 B2 | * | 7/2002 | Nakamura et al. | 378/4 |
| 6,549,645 B1 | * | 4/2003 | Oikawa et al. | 382/132 |
| 6,701,174 B1 | * | 3/2004 | Krause et al. | 600/407 |
| 7,031,425 B2 | * | 4/2006 | Hsieh et al. | 378/5 |
| 7,204,640 B2 | * | 4/2007 | Fu et al. | 378/205 |
| 7,250,949 B2 | * | 7/2007 | Claus et al. | 345/424 |

OTHER PUBLICATIONS

LaRose, "Iterative X-Ray/CT Registration Using Accelerated Volume Rendering", Doctoral Dissertation, Carnegie Mellon University, May 2001 (Introduction, Chapters 1, 3, 4, and 6).*

(Continued)

*Primary Examiner*—Andrew W Johns
*Assistant Examiner*—Jose M Torres

(57) ABSTRACT

A system and corresponding method for flexible generation of digitally reconstructed radiograph (DRR) images on a graphics processing unit (GPU) are provided, the system including a processor, an imaging adapter in signal communication with the processor for receiving volumetric data, an integration unit in signal communication with the processor for integrating the volumetric data into incremental line integrals, and a modeling unit in signal communication with the processor for modeling composite line integrals from the incremental line integrals; and the corresponding method including receiving three-dimensional (3D) volumetric data into a graphics pipeline, integrating the 3D volumetric data into incremental line integrals along a plurality of viewing rays, modeling composite line integrals from the incremental line integrals, and adding the incremental line integrals for each composite line integral to form pixels of the DRR image.

17 Claims, 3 Drawing Sheets

OTHER PUBLICATIONS

Ohnesorge et al., "Efficient Object Scatter Correction Algorithm for Third and Fourth Generation CT Scanners", Eur. Radiol. 9, 1999, pp. 563-569.*

Cabral et al., "Accelerated Volume Rendering and Tomographic Reconstruction Using Texture Mapping Hardware", IEEE Symposium on Volume Visualization, Washington DC, 1994, pp. 91-98 and 131.*

Hastreiter et al., "Intuitive and Interactive Manipulation of 3D Datasets by Integrating Texture Mapping Based Volume Rendering into the OpenInventor Class Hierarchy", Bildver. fur die Med.: Alg., Sys., Anwend, 1996, pp. 149-154.*

Engel et al., "High-Quality Pre-Integrated Volume Rendering Using Hardware-Accelerated Pixel Shading", Proceedings of the ACM SIGGRAPH/Eurographics workshop on Graphics Hardware, 2001, pp. 9-16.*

Kraus et al., "Hardware-Accelerated Volume and Isosurface Rendering Based on Cell-Projection", IEEE Computer Society Press, 2000, pp. 109-116.*

Gelder et al. "Direct volume rendering with shading via three-dimensional textures. In Proceedings of the 1996 Symposium on Volume Visualization" (San Francisco, California, United States, Oct. 28-29, 1996). Symposium on Volume Visualization. IEEE Press, Piscataway, NJ, 23-ff.*

Drebin et al., "Volume Rendering", ACM Computer Graphics, vol. 22, No. 4, Aug. 1988, pp. 65-74.*

Hege et al., "Volume Rendering Mathematical Models and Algorithmic Aspects", Technical Report TR 93-7, Konrad-Zuse-Zentrum Berlin, 1993.*

Wilson et al., "Direct Volume Rendering via 3D Textures", Baskin Center for Computer Engineering and Information Sciences University of California, Santa Cruz 95064, Jun. 29, 1994.*

Wynn, "Using P-Buffers for Off-Screen Rendering in OpenGL", NVIDIA Corporation, white paper, 2001.*

Cullip et al., "Accelerating Volume Reconstruction with 3D Texture Hardware", Technical Report TR93-027, University of North Carolina at Chapel Hill, USA, 1994.*

* cited by examiner

FLEXIBLE GENERATION OF DIGITALLY RECONSTRUCTED RADIOGRAPHS

CROSS-REFERENCE TO RELATED APPLICATION

The present application claims the benefit of U.S. Provisional Application Ser. No. 60/564,149, filed Apr. 21, 2004 and entitled "Flexible DRR Generation using Programmable Computer Hardware", which is incorporated herein by reference in its entirety.

BACKGROUND

Digitally Reconstructed Radiographs (DRRs) are simulated two-dimensional (2D) X-ray or portal transmission images, which are computed from three-dimensional (3D) datasets such as computed tomography (CT), megavoltage computed tomography (MVCT), 3D imaging of high contrast objects using rotating C-arms, and the like. DRRs have many uses in the diagnosis, therapy and treatment workflows, such as in patient positioning for radiotherapy, augmented reality, and/or 2D to 3D registration between pre-surgical data and intra-surgical fluoroscopic images, for example.

DRRs are commonly generated by casting rays through the volumetric datasets and by integrating the intensity values along these rays, which is typically accomplished after passing the intensities through a lookup table that models ray-tissue interactions. Unfortunately, this process is prohibitively slow for real-time or near real-time applications.

Existing methods for DRR generation typically trade off processing speed versus accuracy, and/or require extensive pre-processing of the data. LaRose, for example, proposed an advanced DRR generation algorithm that also used hardware acceleration. Unfortunately, the LaRose algorithm had the drawback of using 2D texture-based volume rendering, which sacrificed accuracy.

Accordingly, what is needed is a system and method for flexible generation of digitally reconstructed radiographs. The present disclosure addresses these and other issues.

SUMMARY

These and other drawbacks and disadvantages of the prior art are addressed by a system and method for flexible generation of digitally reconstructed radiographs.

A system for flexible generation of digitally reconstructed radiograph (DRR) images on a graphics processing unit (GPU) is provided, including a processor, an imaging adapter in signal communication with the processor for receiving volumetric data, an integration unit in signal communication with the processor for integrating the volumetric data into incremental line integrals, and a modeling unit in signal communication with the processor for modeling composite line integrals from the incremental line integrals.

A corresponding method for flexible generation of DRR images on a graphics processing unit (GPU) is provided, including receiving three-dimensional (3D) volumetric data into a graphics pipeline, integrating the 3D volumetric data into incremental line integrals along a plurality of viewing rays, modeling composite line integrals from the incremental line integrals, and adding the incremental line integrals for each composite line integral to form pixels of the DRR image.

These and other aspects, features and advantages of the present disclosure will become apparent from the following description of exemplary embodiments, which is to be read in connection with the accompanying drawings.

BRIEF DESCRIPTION OF THE DRAWINGS

The present disclosure teaches a system and corresponding method for flexible generation of digitally reconstructed radiographs, in accordance with the following exemplary figures, in which.

DETAILED DESCRIPTION OF PREFERRED EMBODIMENTS

The present disclosure describes a novel way to generate Digitally Reconstructed Radiographs (DRRs) of high quality in real-time. DRRs are simulated two-dimensional (2D) transmission images that are computed from three-dimensional (3D) datasets. Exemplary embodiments utilize the programmability offered by graphics processing units (GPUs) to efficiently perform integration along the viewing rays and model many of the physical effects in conventional radiographic image formation. The integral is computed incrementally by summing up rendered slices of the 3D volume to form a composite integral, after converting the values on each slice to total linear attenuation coefficients through post-classification on the GPU.

The DRR projection images may be computed from volumetric data such as magnetic resonance (MR) or computed tomography (CT) images, for example. An exemplary approach includes computation of line integrals through a 3D volume, and connection of the source location to each pixel in the imaging plane.

Figure 1:
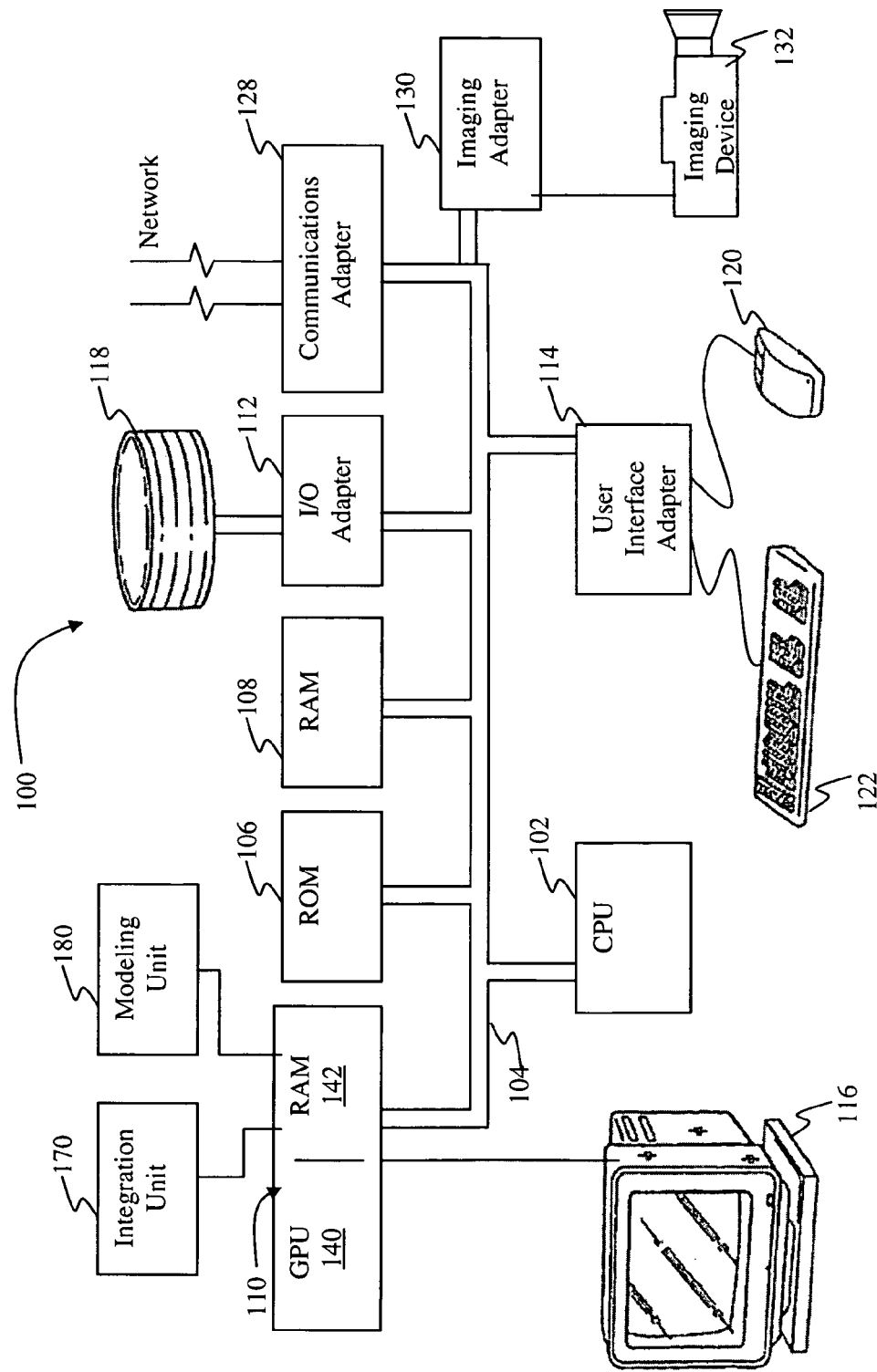
FIG. 1 shows a schematic diagram of a system for flexible generation of digitally reconstructed radiographs in accordance with an illustrative embodiment of the present disclosure.

As shown in FIG. 1, a system for flexible generation of digitally reconstructed radiographs according to an illustrative embodiment of the present disclosure is indicated generally by the reference numeral 100. The system 100 includes at least one processor or central processing unit ("CPU") 102 in signal communication with a system bus 104. A read only memory ("ROM") 106, a random access memory ("RAM") 108, a display adapter 110 having a graphics processing unit ("GPU") 140 in signal communication with a local RAM 142, an I/O adapter 112, a user interface adapter 114, a communications adapter 128, and an imaging adapter 130 are also in signal communication with the system bus 104. Thus, the display adapter 110 is a separate processing unit that includes the GPU 140, a separate and independent bus system (not shown) and a local RAM 142. A display unit 116 is in signal communication with the system bus 104 via the display adapter 110. A disk storage unit 118, such as, for example, a magnetic or optical disk storage unit is in signal communication with the system bus 104 via the I/O adapter 112. A mouse 120 and a keyboard 122 are in signal communication with the system bus 104 via the user interface adapter 114. A magnetic resonance imaging device 132 is in signal communication with the system bus 104 via the imaging adapter 130.

An integration unit 170 and a modeling unit 180 are also included in the system 100 and in signal communication with the display adapter 110 and the GPU 140. While the integration unit 170 and the modeling unit 180 are illustrated as coupled to the at least one display adapter 110 and GPU 140, these components are preferably embodied in computer program code stored in at least one of the memories 106, 108, 118 and 142, wherein the computer program code is executed by the GPU 140. As will be recognized by those of ordinary skill in the pertinent art based on the teachings herein, alternate embodiments are possible, such as, for example, embodying some or all of the computer program code in registers located on the GPU 140. Given the teachings of the disclosure provided herein, those of ordinary skill in the pertinent art will contemplate various alternate configurations and implementations of the integration unit 170 and the modeling unit 180, as well as the other elements of the system 100, while practicing within the scope and spirit of the present disclosure.

Figure 2:
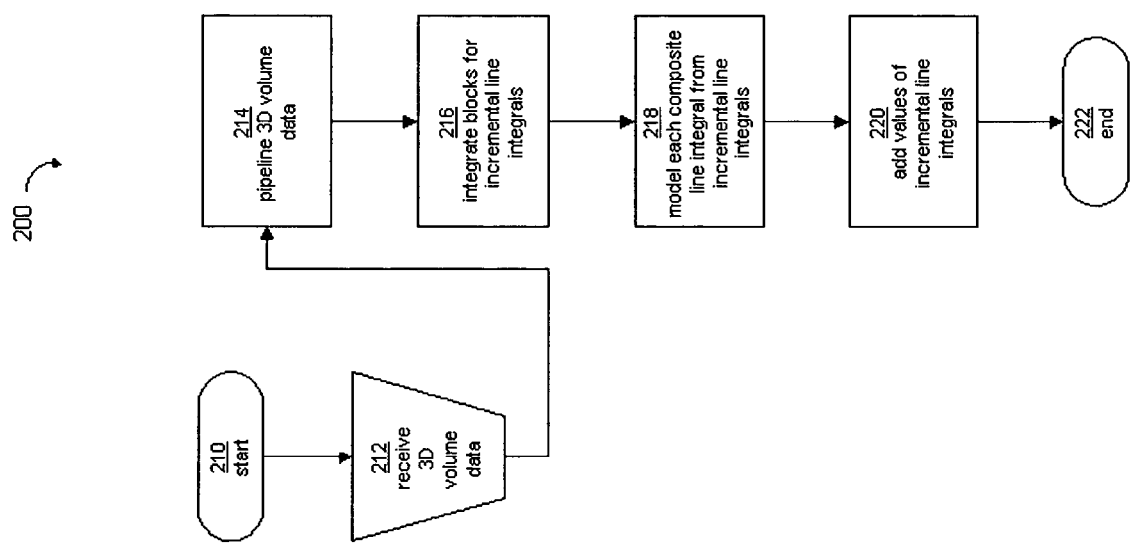
FIG. 2 shows a flow diagram of a method for flexible generation of digitally reconstructed radiographs in accordance with an illustrative embodiment of the present disclosure.

Turning to FIG. 2, a method for flexible generation of digitally reconstructed radiographs according to an illustrative embodiment of the present disclosure is indicated generally by the reference numeral 200. The method 200 includes a start block 210 that passes control to an input block 212. The input block 212 receives 3D volume data, and passes control to a function block 214. The function block 214 pipelines the 3D volume into a graphics processing unit, and passes control to a function block 216. The function block 216 integrates the pipelined data of the 3D volume into a dense set of incremental line integrals at various angles and positions, and passes control to a function block 218. The function block 218 models each composite line integral from a set of incremental line integrals, and passes control to a function block 220. The function block 220, in turn, adds up the values of the appropriate incremental line integrals as stored in a precomputed look-up table, and passes control to an end block 222.

Figure 3:
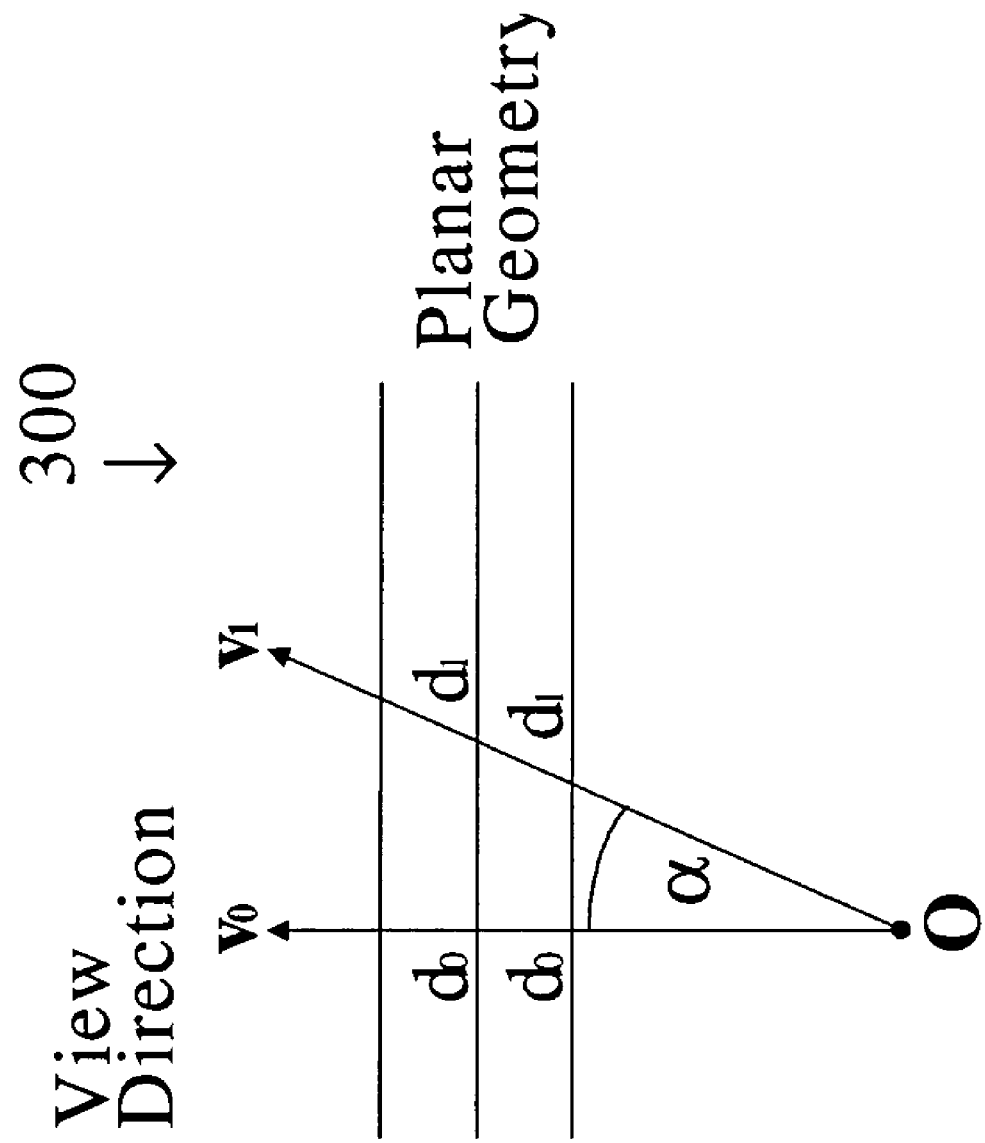
FIG. 3 shows a schematic diagram of non-uniform sampling distances due to the projection of a proxy-geometry in accordance with an illustrative embodiment of the present disclosure.

Turning now to FIG. 3, an apparatus for flexible generation of digitally reconstructed radiographs according to an illustrative embodiment of the present disclosure is indicated generally by the reference numeral 300. The apparatus 300 shows the effect on sampling distance when sampling along rays in different directions. Here, exemplary rays project from an origin O in view directions v0 and v1 through a planar proxy geometry. The angular difference between the view directions v0 and v1 is the included angle α. The v0 ray has sampling distances d0 through the planar proxy geometry, while the v1 ray has sampling distances d1 through the planar proxy geometry.

An exemplary embodiment uses high level shading languages as known in the art, along with the precision, performance and level of programmability of graphics processing units (GPUs), such as the Nvidia NV30/NV35 architecture, for example, such that complex operations can be performed on the graphics adapter. These GPUs are utilized to perform the operations needed for fast DRR reconstruction. Thus, the GPU 140 is used with local RAM 142 to generate the DRRs where the 3D dataset is stored as a 3D texture, and the GPU is used to implement the DRR generation method.

A high-precision graphics pipeline for DRR generation is used, and the integral along the viewing rays is computed as a weighted sum of an appropriate collection of rendered geometric elements, such as planes, shells, and the like, which are surface-textured by means of 3D texturing.

Interpolated texture values are converted to total linear attenuation coefficients through post-classification on the GPU. By using the effective energy of the radiation source, exemplary embodiments model Compton and photoelectric interactions. This conversion may be performed through function evaluation, table lookup or texture lookup; and it allows for the generation of images resembling megavolt images with substantially pure Compton interaction, diagnostic X-ray images with substantially pure photoelectric interaction, or the combination at any ratio in between.

Weighting factors may be used to correct for non-uniform sampling distances due to the projection of the proxy-geometry, such as in the perspective projection of planes as indicated in FIG. 3. Simulation and/or correction of geometric distortions may be computed through function evaluation or texture lookup. Simulation and/or correction of intensity distortions may be computed through function evaluation or texture lookup.

Deformation of the volumetric dataset to support deformable registration and/or visualization of deformed dataset may be generated through function evaluation or texture lookup. Off-screen rendering, such as rendering to textures or P-buffer, may be used to make computed DRRs available for further processing, such as for image gradient computation, and to achieve independence from limitations of display devices such as limited resolution, precision, and the like.

Simulation of the scattering effect of the beam on the resultant simulated projection image may be performed using a pre-defined point spread function (PSF). The affect of the point spread function can be applied on individual re-sampled textures and/or the final integrated result. The implementation may take advantage of the GPU to gain computational speed.

Similar methodologies can be adopted to generate simulated transmissive projection images from the sources with various energies and/or wavelengths. Knowledge of the spatial attenuation of the media from which the source beams pass through at the appropriate range of energies, and the spectra of the source and the scattering properties of the media and the source, are used for modeling. For example, an application embodiment may include efficient generation of the near infrared optical simulation images of a subject with known a priori attributes. Preferably, the integrals should be uniformly spaced in 3D space to generate a substantially perfect DRR image.

In an exemplary embodiment, the line integral fragments are stored in the form of textures within a GPU, and the algorithm is implemented using the graphics hardware capabilities of the GPU. The values of the incremental line integrals may also be stored as textures within the GPU for hardware accelerated DRR generation.

The positions and sizes of subvolumes of the volumetric data set are preferably adapted to the properties of the volumetric data. The hierarchy of blocks with various sizes and overlap amounts are pre-computed and used for DRR reconstructions. Such algorithms can be used for rendering transparent volumes. In addition, each line integral may be pieced together by interpolating the pre-computed incremental line integrals first among the neighboring subvolumes, and second among the neighboring directions within a subvolume.

These and other features and advantages of the present disclosure may be readily ascertained by one of ordinary skill in the pertinent art based on the teachings herein. It is to be understood that the teachings of the present disclosure may be implemented in various forms of hardware, software, firmware, special purpose processors, or combinations thereof.

Most preferably, the teachings of the present disclosure are implemented as a combination of hardware and software. Moreover, the software is preferably implemented as an application program tangibly embodied on a program storage unit. The application program may be uploaded to, and executed by, a machine comprising any suitable architecture.

Preferably, the machine is implemented on a computer platform having hardware such as one or more graphics processing units (GPU), a random access memory (RAM), and input/output (I/O) interfaces. The computer platform may also include an operating system and microinstruction code. The various processes and functions described herein may be either part of the microinstruction code or part of the application program, or any combination thereof, which may be executed by a GPU. In addition, various other peripheral units may be connected to the computer platform such as an additional data storage unit and a printing unit.

It is to be further understood that, because some of the constituent system components and methods depicted in the accompanying drawings are preferably implemented in software, the actual connections between the system components or the process function blocks may differ depending upon the manner in which the present disclosure is programmed. Given the teachings herein, one of ordinary skill in the pertinent art will be able to contemplate these and similar implementations or configurations of the present disclosure.

Although the illustrative embodiments have been described herein with reference to the accompanying drawings, it is to be understood that the present disclosure is not limited to those precise embodiments, and that various changes and modifications may be effected therein by one of ordinary skill in the pertinent art without departing from the scope or spirit of the present disclosure. All such changes and modifications are intended to be included within the scope of the present disclosure as set forth in the appended claims.

What is claimed is:

1. A method for a graphics processing unit (GPU) to generate digitally reconstructed radiograph (DRR) images, the method performed by said GPU comprising the steps of:
   receiving three-dimensional (3D) volumetric data into a graphics pipeline, wherein said 3D volumetric data is stored as a 3D texture;
   integrating the 3D volumetric data into incremental line integrals along a plurality of viewing rays, wherein values of said incremental line integrals are stored as textures within the GPU;
   modeling composite line integrals from the incremental line integrals;
   adding the incremental line integrals for each composite line integral to form pixels of the DRR image; and
   correcting for non-uniform sampling distances due to the projection of a proxy-geometry by means of weighting factors,
   wherein each incremental line integral along a viewing ray is a weighted sum of rendered geometric elements, which are surface-textured by means of 3D texturing, and wherein line integral fragments are stored as textures within said GPU.

2. A method as defined in claim 1, further comprising:
   interpolating the texture values of the rendered geometric elements; and
   converting the interpolated texture values into total linear attenuation coefficients through post-classification on the GPU.

3. A method as defined in claim 2, further comprising:
   modeling at least one of Compton or photoelectric interactions by using an effective energy of a radiation source; and
   converting the interpolated texture values into total linear attenuation coefficients through at least one of function evaluation, table lookup and texture lookup to generate images reflecting at least one of Compton interaction and photoelectric interaction.

4. A method as defined in claim 1, further comprising at least one of simulation or correction of geometric distortions.

5. A method as defined in claim 4 wherein the correction is computed through at least one of function evaluation or texture lookup.

6. A method as defined in claim 1, further comprising at least one of simulation or correction of intensity distortions.

7. A method as defined in claim 6 wherein the correction is computed through at least one of function evaluation or texture lookup.

8. A method as defined in claim 1, further comprising:
   deformation of the volumetric dataset to support at least one of deformable registration or deformable visualization of the deformed dataset.

9. A method as defined in claim 8 wherein the deformation is generated through at least one of function evaluation or texture lookup.

10. A method as defined in claim 1, further comprising:
    off-screen rendering to at least one of textures or a P-buffer to make computed DRR images available for further processing and achieve independence from limitations of display devices.

11. A method as defined in claim 10 wherein the further processing comprises computation of an image gradient.

12. A method as defined in claim 1, further comprising simulating the scattering effect of a beam on the resultant DRR image by using a pre-defined point spread function (PSF).

13. A method as defined in claim 12 wherein the effect of the PSF is applied on at least one of individual re-sampled textures or a final integrated result.

14. A method for a graphics processing unit (GPU) to generate simulated transmissive projection (STP) images, the method performed by said GPU comprising the steps of:
    receiving three-dimensional (3D) volumetric data into a graphics pipeline from source beams having a plurality of energies and wavelengths;
    integrating the 3D volumetric data into incremental line integrals along a plurality of viewing rays;
    modeling composite line integrals from the incremental line integrals;
    adding the incremental line integrals for each composite line integral to form pixels of the STP image;
    correcting for non-uniform sampling distances due to the projection of a proxy-geometry by means of weighting factors; and
    generating near infrared optical simulation images of a subject with known a priori attributes,
    wherein each incremental line integral along a viewing ray is a weighted sum of rendered geometric elements, which are surface-textured by means of 3D texturing.

15. A method as defined in claim 14, modeling comprising encoding knowledge of the spatial attenuation of media through which the source beams pass at the appropriate range of energies, and the spectra of the source and the scattering properties of the media and the source.

16. A system for flexible generation of at least one of digitally reconstructed radiograph images (DRR) or simulated transmissive projection (STP) images, comprising:
    a processor;
    an imaging adapter in signal communication with the processor for receiving volumetric data, wherein said 3D volumetric data is stored as a 3D texture;
    an integration unit in signal communication with the processor for integrating the volumetric data into incremental line integrals, wherein values of said incremental line integrals are stored as textures within the GPU; and a modeling unit in signal communication with the processor for modeling composite line integrals from the incremental line integrals and correcting for non-uniform sampling distances due to the projection of a proxy-geometry by means of weighting factors, wherein line integral fragments are stored as textures within said GPU, wherein each incremental line integral along a viewing ray is a weighted sum of rendered geometric elements, which are surface-textured by means of 3D texturing.

17. A program storage device readable by machine, tangibly embodying a program of instructions executable by the machine to perform program steps for flexible generation of at least one of digitally reconstructed radiograph (DRR) images or simulated transmissive projection (STP) images on a graphics processing unit (GPU), the program steps comprising:

receiving three-dimensional (3D) volumetric data into a graphics pipeline;

integrating the 3D volumetric data into incremental line integrals along a plurality of viewing rays;

modeling composite line integrals from the incremental line integrals;

adding the incremental line integrals for each composite line integral to form pixels of the DRR image;

correcting for non-uniform sampling distances due to the projection of a proxy-geometry by means of weighting factors; and generating near infrared optical simulation images of a subject with known a priori attributes, wherein each incremental line integral along a viewing ray is a weighted sum of rendered geometric elements, which are surface-textured by means of 3D texturing.

* * * * *